United States Patent
Schlichter et al.

(10) Patent No.: US 11,458,424 B2
(45) Date of Patent: Oct. 4, 2022

(54) FILTER DEVICE

(71) Applicant: HYDAC PROCESS TECHNOLOGY GMBH, Neunkirchen (DE)

(72) Inventors: Bernhard Schlichter, Saarbrücken (DE); Jörg Hermann Gerstner, Püttlingen (DE); Albert Kaints, Spiesen-Elversberg (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 30 days.

(21) Appl. No.: 16/769,296

(22) PCT Filed: Nov. 16, 2018

(86) PCT No.: PCT/EP2018/081575
§ 371 (c)(1),
(2) Date: Jun. 3, 2020

(87) PCT Pub. No.: WO2019/110279
PCT Pub. Date: Jun. 13, 2019

(65) Prior Publication Data
US 2021/0170312 A1    Jun. 10, 2021

(30) Foreign Application Priority Data
Dec. 5, 2017 (DE) .................. 10 2017 011 221.5

(51) Int. Cl.
*B01D 29/68* (2006.01)
*B01D 29/52* (2006.01)
*B01D 29/66* (2006.01)

(52) U.S. Cl.
CPC .......... *B01D 29/682* (2013.01); *B01D 29/52* (2013.01); *B01D 29/668* (2013.01); *B01D 2201/082* (2013.01)

(58) Field of Classification Search
CPC .... B01D 29/682; B01D 29/52; B01D 29/688; B01D 2201/082
(Continued)

(56) References Cited

FOREIGN PATENT DOCUMENTS

| CN | 105536331 | 11/2017 |
|---|---|---|
| DE | 2 327 532 | 12/1974 |

(Continued)

OTHER PUBLICATIONS

International Search Report (ISR) dated Feb. 5, 2019 in International (PCT) Application No. PCT/EP2018/081575.

*Primary Examiner* — Thomas M Lithgow
(74) *Attorney, Agent, or Firm* — Wenderoth, Lind & Ponack, L.L.P.

(57) ABSTRACT

A filter device has a filter housing (1) having a fluid inlet (8) for unfiltered matter and having a fluid outlet (9) for filtrate, and has at least one one-piece or multi-part filter insert (15, 17) held in the filter housing (1). Filter insert (15, 17) can be cleaned using a backwash device (25) having at least one backwash element (31) in counter flow to the direction of filtration. The backwash element can be moved along the inside of the relevant filter insert (15, 17) by a fluid-conveying drive shaft (29) of a rotary drive (69, 71). The individual backwash element (31) has, at the end adjacent to this inside, at least one gap-shaped passage opening, which extends in parallel to the axis of rotation of the drive shaft (29) and which opens into a flow chamber connected to the drive shaft (29) in a fluid-conveying manner. At least one further backwash device (27) has a further backwash element (31). The fluid-conveying drive shaft (29) is divided into chambers (73, 75) separated from each other. One backwash element (31) of one backwash device (25) is connected to one of the chambers (73, 75). The other (Continued)

backwash element (31) of the other backwash device (27) is connected to another chamber (73, 75).

15 Claims, 5 Drawing Sheets

(58) Field of Classification Search
 USPC .......................................................... 210/411
 See application file for complete search history.

(56) References Cited

FOREIGN PATENT DOCUMENTS

| | | |
|---|---|---|
| DE | 34 43 752 | 6/1986 |
| DE | 20 2011 000 268 | 7/2012 |
| DE | 10 2017 002 646 | 9/2018 |
| WO | WO 2015189774 A * | 12/2015 |

* cited by examiner

FILTER DEVICE

FIELD OF THE INVENTION

The invention relates to a filter device comprising a filter housing having a fluid inlet for unfiltered matter, having a fluid outlet for filtrate and having at least one multi-part or one-piece filter insert held in the filter housing. The filter insert can be cleaned using a backwash device having at least one backwash element in counter flow to the direction of filtration. The backwash device can be moved by a fluid-conveying drive shaft of a rotary drive along the inside of the relevant filter insert. The individual backwash element has, at the end adjacent to the filter insert inside, at least one gap-shaped passage opening. This opening extends in parallel to the axis of rotation of the drive shaft and opens into a flow chamber connected to the drive shaft in a fluid-conveying manner.

BACKGROUND OF THE INVENTION

Filter devices of this type are state of the art, see for instance DE202011000268U. Cleaning filter inserts by backwashing results in the option of longer operating times between changing the filter inserts in these filter devices. This backwashing reduces maintenance costs and prevents frequent interruptions of operation. In combination with intelligent filter control systems, the filter units can be operated in automatic mode such that a backwash process is initiated if, due to dirt accumulating on the filter, the differential pressure $\Delta p$ reaches a preselected limit value at which cleaning is required. If such filter devices are used for applications in which there may be temporary dirt surges, for instance in maritime applications, such as ballast water applications, where extreme dirt concentrations in the inflow may occur, e.g. due to sediment turbulence in port basins, the known filter devices are inadequate. For reasons of economy and because of the installation sizes required, it is not practical to design the filter device for the worst-case scenario of such applications, i.e. for extreme dirt surges, so-called TSS peaks (totally suspended solids). In terms of process stability and availability of equipment of the known filter devices there is room for improvement.

SUMMARY OF THE INVENTION

In view of this issue, the invention addresses the problem of providing a filter device of the type mentioned above, which guarantees a high operational reliability for applications in which extreme dirt surges are to be expected.

According to the invention, this object is basically achieved by a filter device having, as an essential feature of the invention, at least one further backwash device having at least one further backwash element. The fluid-conveying drive shaft is divided into chambers separated from each other. The one backwash element of the one backwash device is connected to one of the chambers, and the other backwash element of the other backwash device is connected to another chamber. Because at least one additional backwash device is provided for each individual filter insert, the backwash efficiency of the filter device according to the invention can be flexibly adapted to the requirements for different dirt concentrations in the filter inlet. Activating the second backwash device accelerates the dirt discharge by 100% compared to the known operation having one backwash device per filter insert, i.e. even extreme dirt surges (TSS peaks) can be controlled.

Advantageously, the filter device according to the invention can be operated such that in normal operation, by opening only one of the chambers via a flushing valve, only one backwash device is operated for one backwash period as long as the increase $\Delta p$ over time at the filter is within a preselected limit value. If the increase in differential pressure accelerates, this one backwash unit is put into continuous operation. If a dirt surge occurs in this operating condition, the second backwash device is switched on by opening the backwash valve of the second chamber until the differential pressure drops to the desired value, after which the second backwash device is switched off again. The continuous flushing using the first backwash device is preferably maintained for a preselected time until the condition has returned to normal load. In this way, the invention permits a more efficient use of the screen area for high TSS mass flows. For smaller filter sizes, higher TSS peaks can be reliably controlled in this way.

Advantageously, the backwash devices used are arranged diametrically opposite from each other in relation to the axis of rotation of the drive shaft.

More than two back-backwash elements can be used, which are subdivided into groups and assigned to the one and to the further backwash device. A group of at least two backwash elements arranged vertically one above the other in parallel to the axis of rotation of the drive shaft can form a backwash device.

The arrangement can advantageously be made such that the drive shaft is divided into two chambers along its axis of rotation. The backwash elements of one backwash device open into one chamber, and the backwash elements of the other backwash device open into the other chamber.

For the connection of the chambers to their assigned backwash valves, the drive shaft can have passage openings on its opposite end faces for the discharge of backwash fluid of the one or the other backwash device.

In advantageous exemplary embodiments, two vertically superimposed filter inserts are provided, each of which has two backwash devices. In both filter inserts, the backwash elements of one backwash device open into one chamber and the backwash elements of the other backwash device open into another chamber.

In the case of particularly advantageous exemplary embodiments, in the case of two filter inserts situated one above the other, the drive shaft is divided transversely to the axis of rotation into two further chambers. The backwash elements of one backwash device in each filter insert are connected to one passage opening via one assigned chamber each. The backwash elements of the other backwash device are connected to the other passage opening via one further chamber each. Therefore, when both backwash devices of both filter inserts are in operation, the backwash quantities of two axially offset backwash devices flow out of each passage opening of the drive shaft. This arrangement results in a compensation of the flow forces acting on the drive shaft and in a reduction of mechanical stress.

The discharge of backwash fluid via the passage openings of the drive shaft can be controlled by flushing valves. Those valves can be actuated in a known manner by the assigned filter control system.

There is a coupling point for the engagement of a drive motor on one of the end faces of the drive shaft, preferably on its upper end face in the vertical installation direction.

With particular advantage, the backwash elements are guided along the inside of the individual assignable filter insert without gap.

The subject matter of the invention is also a process for operating a filter device according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
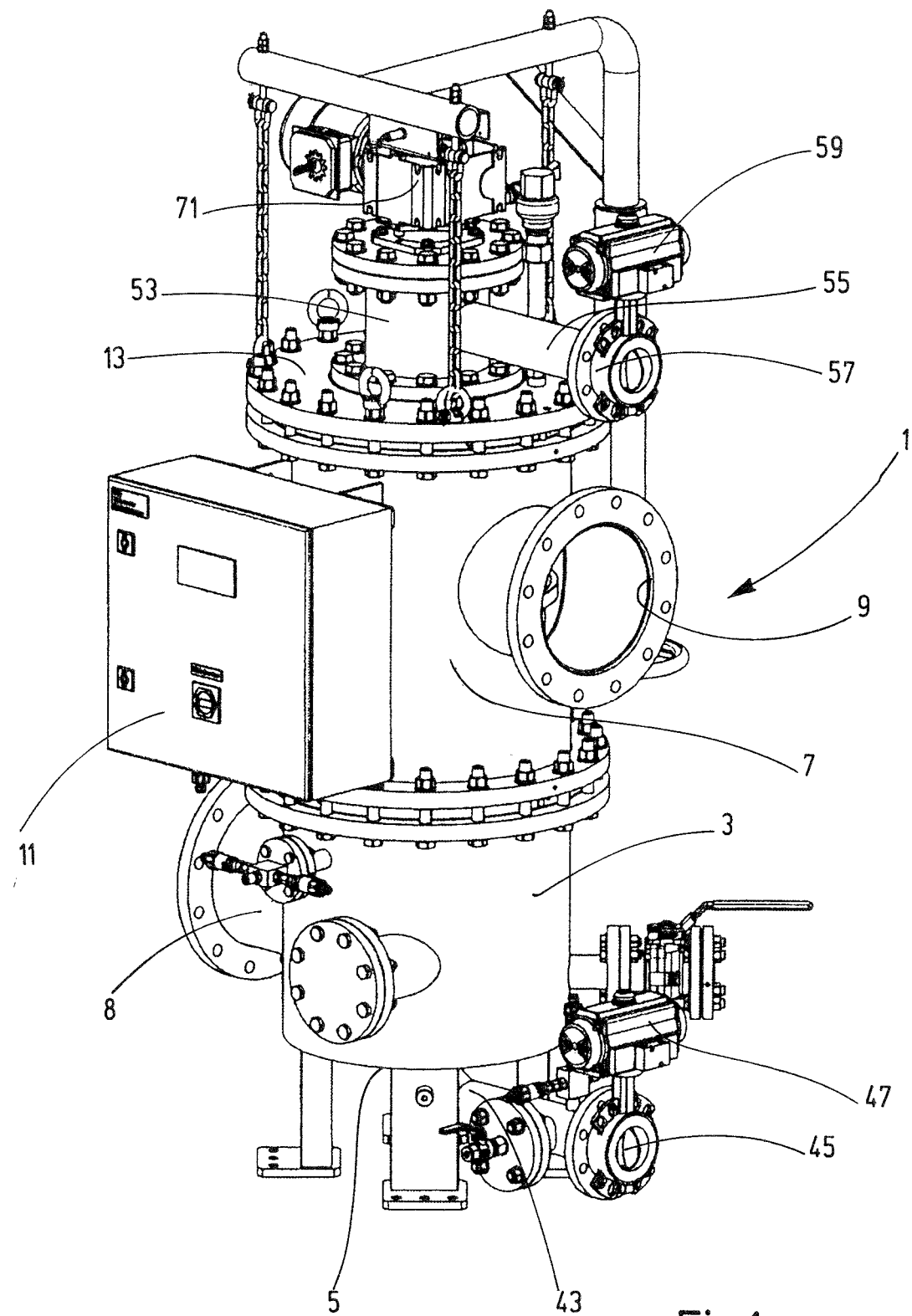
FIG. 1 is a perspective view of a filter device according to a first exemplary embodiment of the invention.

FIGS. 1 to 4 illustrate an exemplary embodiment of the filter device according to the invention, as a whole, including a filter housing 1. The two-part filter housing 1 has a circular cylindrical inlet part 3 having a closed base 5. On the inlet part 3, there is a main housing part 7, which is circular-cylindrical in shape like the inlet part 3. A fluid inlet 8 is provided on its sidewall for the inflow of unfiltered matter into the inlet part 3. A fluid outlet 9 for filtrate is located on the sidewall of the main part 7. As shown in FIG. 1, a switch box 11 is mounted on the outside of the main part 7 and contains, among other things, a state-of-the-art electronic filter control system. At the top the main part 7 is closed by a cover part 13. A lower filter insert 15 and an upper filter insert 17 are held in the main part 7. The filter sieves 19 and 21 of the lower and upper filter inserts 15, 17 are flowed through from the inside to the outside during the filtration process. The flow of unfiltered matter to the interior of the filter inserts 15, 17 occurs from the inlet section 3 via a pre-filter 23, which is intended for maritime use as a fish screen.

Figure 2:
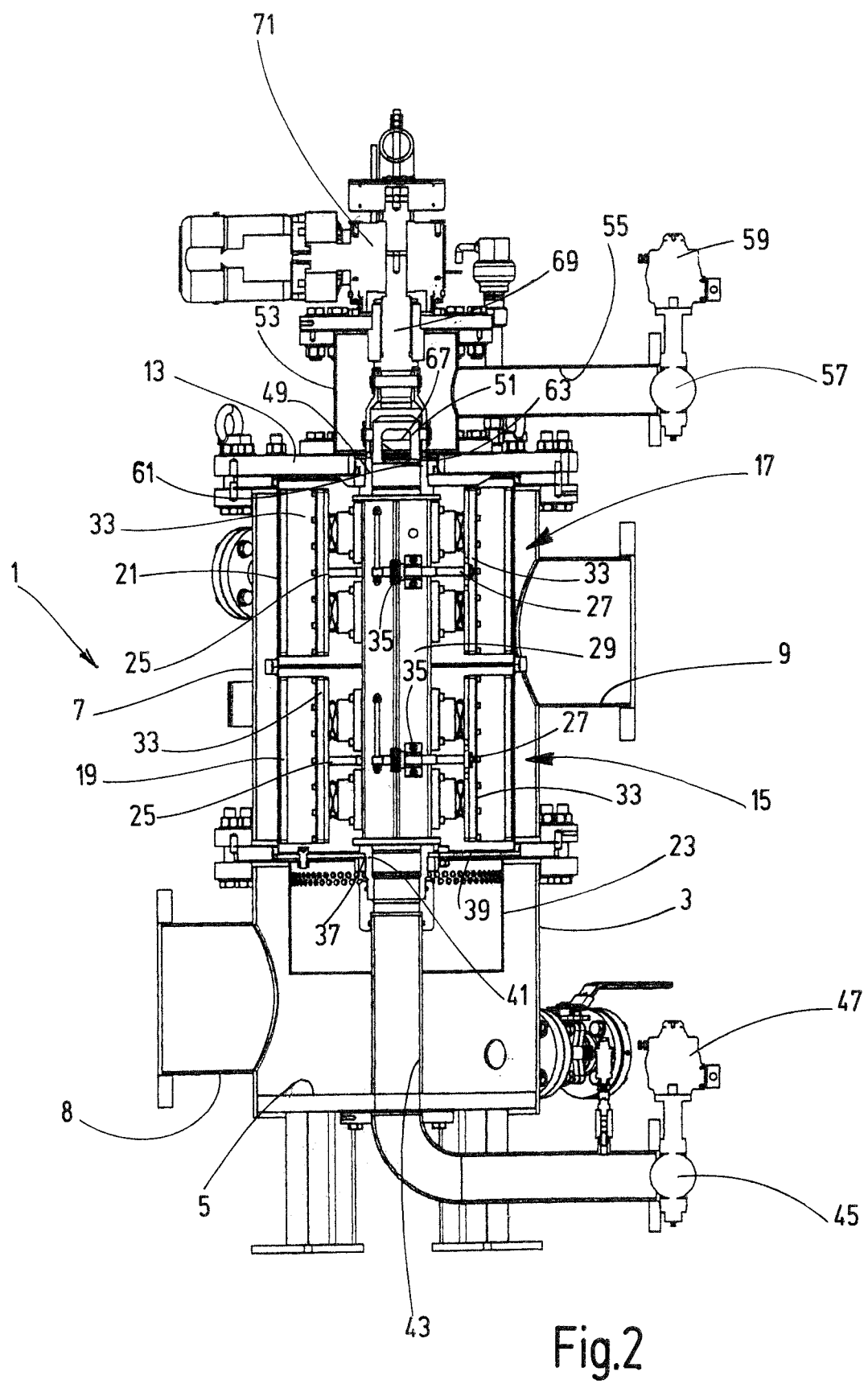
FIG. 2 is a side view in section of the filter device of FIG. 1, wherein the section plane has been moved out of the drawing plane in certain areas.
Figure 3:
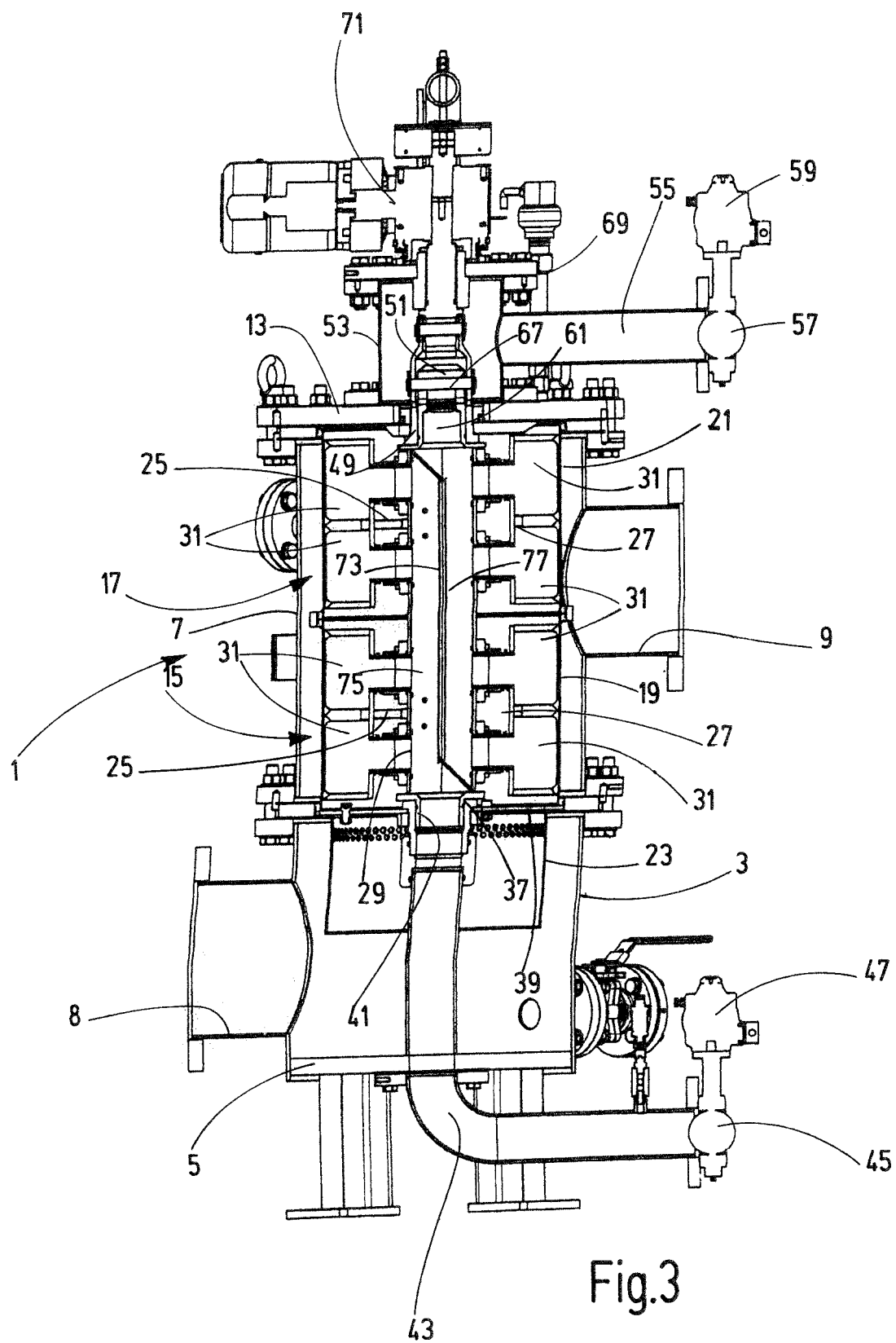
FIG. 3 is a side view in a central section of the filter device of FIG. 1.
Figure 4:
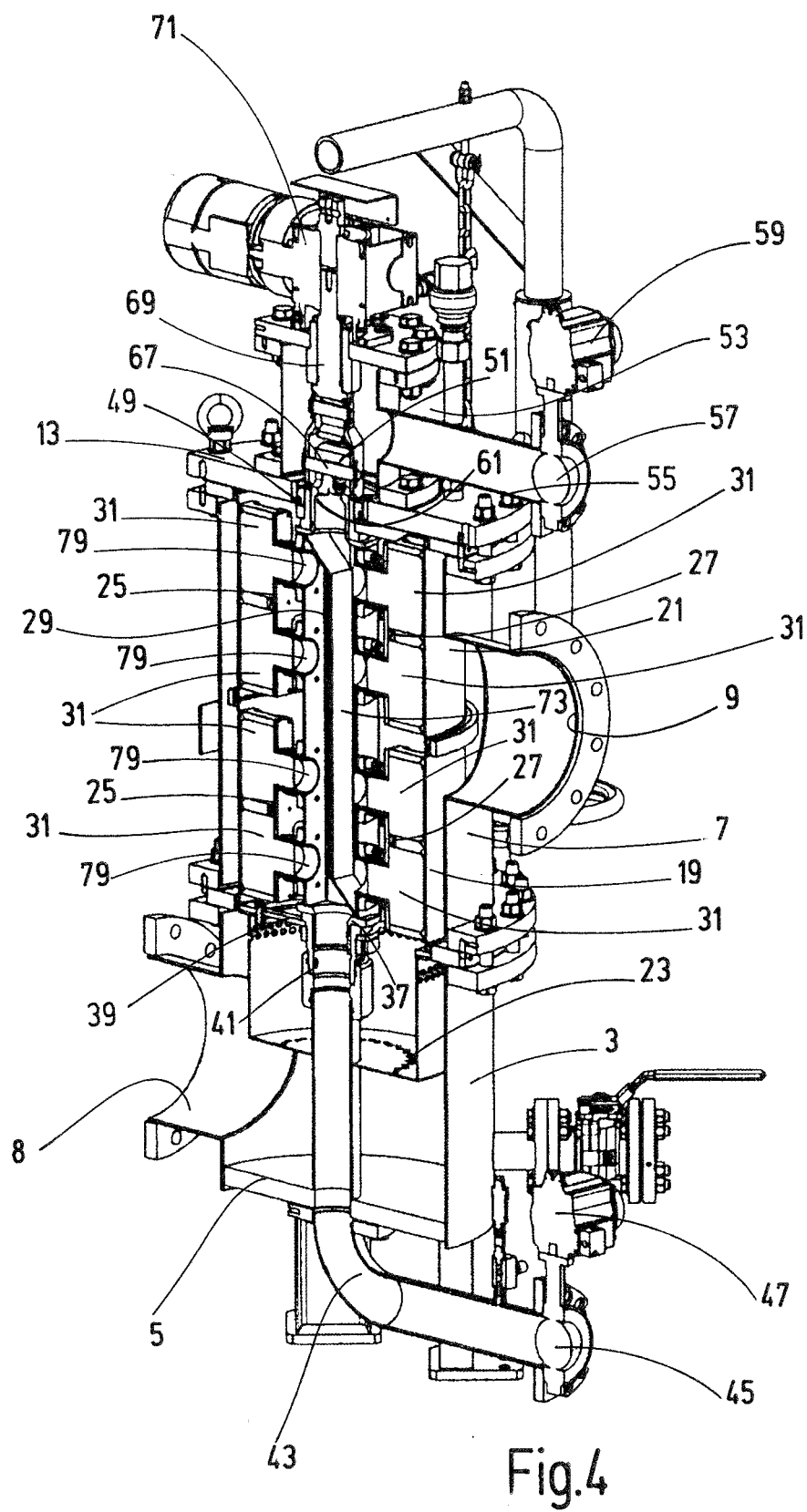
FIG. 4 is a perspective view of the filter device of FIG. 1 vertically cut away in a central sectional plane.

For cleaning deposits on the filter screens 19, 21 from the lower and upper filter inserts 15 and 17, respectively, each filter insert 15, 17 has a first backwash device 25 and a second backwash device 27, which are each mounted diametrically opposite from each other on a drive shaft 29. Drive shaft 29 is formed by a hollow shaft, which has a rectangular cross-section in the section extending through the filter inserts 15, 17. As shown in FIGS. 3 and 4, the backwash devices 25 and 27 of the filter inserts 15, 17 each have two backwash elements 31, which are arranged in pairs one above the other. Each pair is supported on a joint support 33 as shown in FIG. 2. An adjusting device 35 (FIG. 2) can be used to adjust the position of the supports 33 relative to the drive shaft 29 such that the outside of the backwash elements 31, on which outside there is a backwash inlet slot as per usual, is guided along the inside of the relevant filter screen 19, 21 without gap during the rotational movement of the drive shaft 29. The adjusting devices 35 having a spindle drive may be designed in the manner as disclosed, for instance, in FIGS. 1 to 3 of an application DE102017002646.7, which shows a post-published state of the art, such that the adjusting device 35 provides for a radially outer end position for the supports 33, from which they can be moved radially inwards against a spring force.

Figure 5:
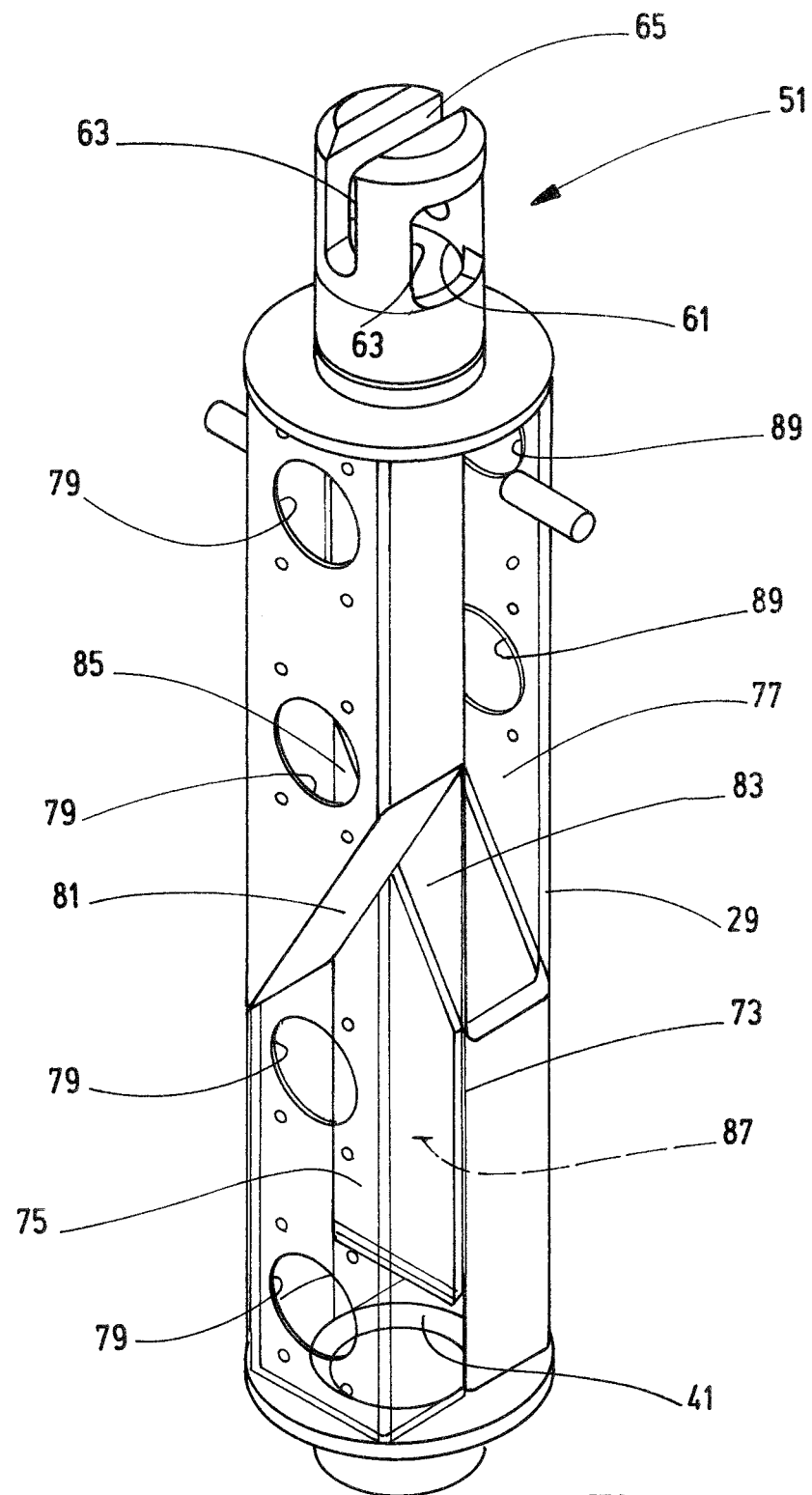
FIG. 5 is a perspective oblique view of the separately shown drive shaft for a second exemplary embodiment of the filter device according to the invention, wherein the outer wall areas are shown transparently to illustrate the design.

The lower end of the drive shaft 29 is supported in a pivot bearing 37, which is held on cross members 39. Cross members 39 extend in the radial direction at the transition from the input part 3 to the main part 7. At the pivot bearing 37, the interior of the hollow drive shaft 29 has a passage opening 41 merging into a flushing line 43. Flushing line 43 is routed through the bottom 5 of the input part 3 to a flushing valve 45, which can be actuated by an electric servomotor 47. The upper end of the drive shaft 29 is supported in a pivot bearing 49 located on the cover part 13. A drive shaft extension 51 of the drive shaft 29 extends through the pivot bearing 49 into an attachment 53 located on the cover part 13. The interior of the attachment 53 is connected to a second flushing valve 57, which can be actuated by an electric servomotor 59, via a second flushing line 55. The drive shaft extension 51 of the drive shaft 29 is designed in the manner of a hollow pin as shown in FIG. 5, using the example of the drive shaft 29 provided for a second exemplary embodiment. As shown, the drive shaft extension 51 has an upper passage opening 61 as an outlet from the interior of the drive shaft 29, as well as lateral, window-shaped wall openings 63 for the fluid connection to the interior of the attachment 53 and then to the flushing line 55. In addition, a coupling slot 65 is formed in the shaft 51, with which a driver 67 of the output shaft 69 of an electric gear motor 71 engages. Motor 71 is arranged on the top of the attachment 53.

As FIGS. 3 and 4 show, in the first exemplary embodiment, the drive shaft 29 is divided by a partition wall 73. Partition wall 73 extends along the axis of rotation over a large part of the length of the drive shaft 29 between the passage openings 41 and 61, separating the interior of the drive shaft 29 into two chambers 75 and 77. The chamber 75 is connected to the lower passage opening 41. The other chamber 77 is connected to the upper passage opening 61. For each filter insert 15 and 17, the flow channels 79, some of which are numbered in FIG. 4 only, of the pair of backwash elements 31 on the left side of the drawing are connected to the chamber 75. The backwash elements 31 of the pairs on the right side are connected to the other chamber 77. When the backwash valve 45 at the first flushing line 43, which is connected to the chamber 75 via the passage opening 41, is opened, a backwash process only occurs using the backwash device 25 of the filter inserts 15, 17. If the second flushing valve 57 is opened when the first flushing valve 45 is closed, the backwash process only occurs using the backwash devices 27 on the right side of the drawing, which backwash devices are connected to the second flushing valve 57 via the second chamber 77, the upper outlet 61 and the backwash line 55. If both flushing valves 45 and 57 are open for a special backwash, the backwash is performed using both backwash devices 25 and 27 of both filter inserts 15 and 17.

The filter device according to the invention can therefore be operated such that under normal operating conditions, in which the increase of the pressure difference Δp at the filter over time remains moderate, only one of the backwash devices 25 or 27 is put into operation in order to compensate for the increase of the pressure difference. If necessary, one of the backwash devices 25 or 27 remains in continuous operation. If an extreme dirt concentration in the inlet, for instance due to the occurrence of a TSS peak, occurs, the second backwash device 25 or 27 of the filter inserts 15, 17 is switched on by opening the relevant further flushing valve 45 or 57. If the differential pressure drops back to the normal value during backwash using both flushing devices 25 and 27, then one backwash device 25 or 27 is switched off again, while continuous flushing using only one backwash device 25 or 27 can be maintained for a preselected time.

FIG. 5 shows the design of the drive shaft 29 of a second exemplary embodiment of the filter device according to the invention. As shown, the interior of the drive shaft 29 is divided into two additional chambers 85 and 87 by two further partitions 81 and 83 extending at an angle to the axis of rotation. The chamber 85 is connected to the upper passage opening 61. The other chamber 87 is connected to the lower passage opening 41. While in the first exemplary embodiment the flow channels 79 connect the backwash devices 25 of both filter inserts 15 and 17 to the lower passage opening 41, in the design of FIG. 5 only the flow channels 79 of the backwash elements 31 of the lower filter insert 15 are connected to the passage opening 41, while the flow channels 79 of the backwash device 25 of the upper filter insert 17 are connected to the upper passage opening 61. The flow channels 89 of the second backwash device 27 of the upper filter insert 17 are also connected to the second backwash device 22, as in the first exemplary embodiment. The fluid channels of the second backwash device 27 of the lower filter insert 15 are connected to the lower passage opening 41, as in the first exemplary embodiment. For this arrangement, when both backwash devices 25 and 27 are operated simultaneously, flow forces occur, which act on the drive shaft 29 at more evenly distributed points, in comparison to the first exemplary embodiment, such that the drive shaft 29 is subject to less mechanical stress during operation.

While various embodiments have been chosen to illustrate the invention, it will be understood by those skilled in the art that various changes and modifications can be made therein without departing from the scope of the invention as defined in the claims.

The invention claimed is:

1. A filter device, comprising:
a filter housing having a fluid inlet for unfiltered matter and a fluid outlet for the filtered matter;
a filter insert in the filter housing having a filter screen;
first and second backwashers capable of cleaning the filter insert, each of the first and second backwashers having two backwash elements arranged one above another in a joint support to issue a backwash fluid flow counter to a direction of filtration fluid flow through the filter insert and being rotatable about a rotational axis along an inside of the filter insert, the first and second backwashers having gap-shaped passage openings at ends thereof adjacent to the inside of the filter insert, parallel to the rotational axis and opening into flow chambers in the backwash elements;
a rotary drive with a fluid-conveying hollow drive shaft being coupled to the first and second backwashers and rotating the first and second backwashers along the inside of the filter insert about the rotational axis, the flow chambers being connected to the drive shaft in a fluid-conveying manner, the drive shaft having an interior divided by a partition wall extending along the rotational axis between passage openings in the drive shaft into first and second shaft chambers being separated from each other by the partition wall and being in fluid communication with the flow chambers of the first and second backwashers, respectively; and
adjusters connected to the joint supports and adjusting positions of the joint supports relative the drive shaft and the filter insert such that the passage openings of the first and second backwashers are guided along the inside of the filter insert without a gap during rotational movement of the drive shaft.

2. A filter device according to claim 1 wherein
the first and second backwashers are arranged diametrically opposite one another relative to the rotational axis.

3. A filter device according to claim 1 wherein
each of the first and second backwashers has more than two of the backwash elements subdivided into groups.

4. A filter device according to claim 1 wherein
the two backwash elements of each of the first and second backwashers are arranged vertically one above another in parallel to the rotational axis.

5. A filter device according to claim 1 wherein
the passage openings in the drive shaft are on opposite end faces of the drive shaft for discharge of backwash fluid from the first and second backwashers, respectively.

6. A filter device according to claim 1 wherein
the first insert comprises first and second insert parts vertically superimposed, one of the two backwash elements of each of the first and second backwashers contacting a respective one of the first and second insert parts.

7. A filter device according to claim 6 wherein
the drive shaft is divided transversely relative to the rotational axis separating third and fourth shaft chambers from the first and second shaft chambers, respectively, each of the two backwash elements opening into a respective one of the first, second, third and fourth shaft chambers.

8. A filter device according to claim 1 wherein
the first and second shaft chambers comprise first and second shaft outlets, respectively, with first and second flushing valves, respectively, controlling flow of backwash fluid through the first and second shaft chambers, respectively.

9. A filter device according to claim 1 wherein
the drive shaft has a coupling point engaged to a drive motor of the rotary drive at an axial end of the drive shaft.

10. A filter device according to claim 9 wherein
the axial end is an upper end of the drive shaft.

11. A filter device, comprising:
a filter housing having a fluid inlet for unfiltered matter and a fluid outlet for filtrate;
a filter insert being cleanable by backwashing in the filter housing;
first and second backwashers having first and second backwash elements, respectively, capable of cleaning the filter insert by issuing a backwash fluid flow in a direction counter to a filtration fluid flow direction through the filter insert, the first and second backwash elements being movable along an inside of the filter insert; and
a rotary drive moving the first and second backwashers and having a fluid-conveying drive shaft with hollow interior divided into first and second chambers by a partition wall, the first and second backwash elements having ends adjacent to the inside of the filter insert with gap-shaped passage openings extending parallel to a rotational axis of the drive shaft and opening into flow chambers connected to the drive shaft in fluid communication with the first and second chambers, respectively, of the hollow interior of the drive shaft, the partition wall extending parallel to the rotational axis and having a flat wall part.

12. A filter device according to claim 11 wherein the flat wall extends along the rotational axis.

13. A filter device according to claim 11 wherein the first and second chambers comprise shaft outlets with independently operable flushing valves controlling the backwash fluid flow independently through the first and second chambers.

14. A method of operating a filter device using a filter device, comprising a filter housing having a fluid inlet for unfiltered matter and a fluid outlet for the filtered matter; a filter insert in the filter housing having a filter screen; first and second backwashers capable of cleaning the filter insert, each of the first and second backwashers having two backwash elements arranged one above another in a joint support to issue a backwash fluid flow counter to a direction of filtration fluid flow through the filter insert and being rotatable about a rotational axis along an inside of the filter insert, the first and second backwashers having gap-shaped passage openings at ends thereof adjacent to the inside of the filter insert, parallel to the rotational axis and opening into flow chambers in the backwash elements; a rotary drive with a fluid-conveying hollow drive shaft being coupled to the first and second backwashers and rotating the first and second backwashers along the inside of the filter insert about the rotational axis, the flow chambers being connected to the drive shaft in a fluid-conveying manner, the drive shaft having an interior divided by a partition wall extending along the rotational axis between passage openings in the drive shaft into first and second shaft chambers being separated from each other by the partition wall and being in fluid communication with the flow chambers of the first and second backwashers, respectively; adjusters connected to the joint supports and adjusting positions of the joint supports relative the drive shaft and the filter insert such that the passage openings of the first and second backwashers are guided along the inside of the filter insert without a gap during rotational movement of the drive shaft; and the first and second shaft chambers having first and second shaft outlets, respectively, with first and second flushing valves, respectively, controlling flow of backwash fluid through the first and second shaft chambers, respectively, the method comprising the steps of:

in a normal backwashing operation, opening the first flushing valve while maintaining the second flushing valve closed, and operating the first backwasher for a backwash period as long as a pressure differential over time across the filter insert is within a preselected limit value;

if an increase in the differential pressure accelerates, the first backwasher is continuously operated with the first flushing valve open and the second flushing valve closed;

if a dirt surge occurs, the second backwasher is placed in operation by opening the second flushing valve while the first flushing valve is open until the differential pressure drops to the preselected limit value, the second flushing valve being closed upon the differential pressure being within the preselected limit value; and continuing backwashing of the filter insert with the first backwasher only until a normal pressure differential is detected.

15. A method of operating a filter device using a filter device, comprising a filter housing having a fluid inlet for unfiltered matter and a fluid outlet for filtrate; a filter insert being cleanable by backwashing in the filter housing; first and second backwashers having first and second backwash elements, respectively, capable of cleaning the filter insert by issuing a backwash fluid flow in a direction counter to a filtration fluid flow direction through the filter insert, the first and second backwash elements being movable along an inside of the filter insert; a rotary drive moving the first and second backwashers and having a fluid-conveying drive shaft with hollow interior divided into first and second chambers by a partition wall, the first and second backwash elements having ends adjacent to the inside of the filter insert with gap-shaped passage openings extending parallel to a rotational axis of the drive shaft and opening into flow chambers connected to the drive shaft in fluid communication with the first and second chambers, respectively, of the hollow interior of the drive shaft, the partition wall extending parallel to the rotational axis and having a flat wall part; and the first and second chambers having shaft outlets with independently operable flushing valves independently controlling the backwash fluid flow through the first and second chambers, the method comprising steps of:

in a normal backwashing operation, opening the first flushing valve while maintaining the second flushing valve closed, and operating the first backwasher for a backwash period as long as a pressure differential over time across the filter insert is within a preselected limit value;

if an increase in the differential pressure accelerates, the first backwasher is continuously operated with the first flushing valve open and the second flushing valve closed;

if a dirt surge occurs, the second backwasher is placed in operation by opening the second flushing valve while the first flushing valve is open until the differential pressure drops to the preselected limit value, the second flushing valve being closed upon the differential pressure being within the preselected limit value; and continuing backwashing of the filter insert with the first backwasher only until a normal pressure differential is detected.

* * * * *